Figure 1:
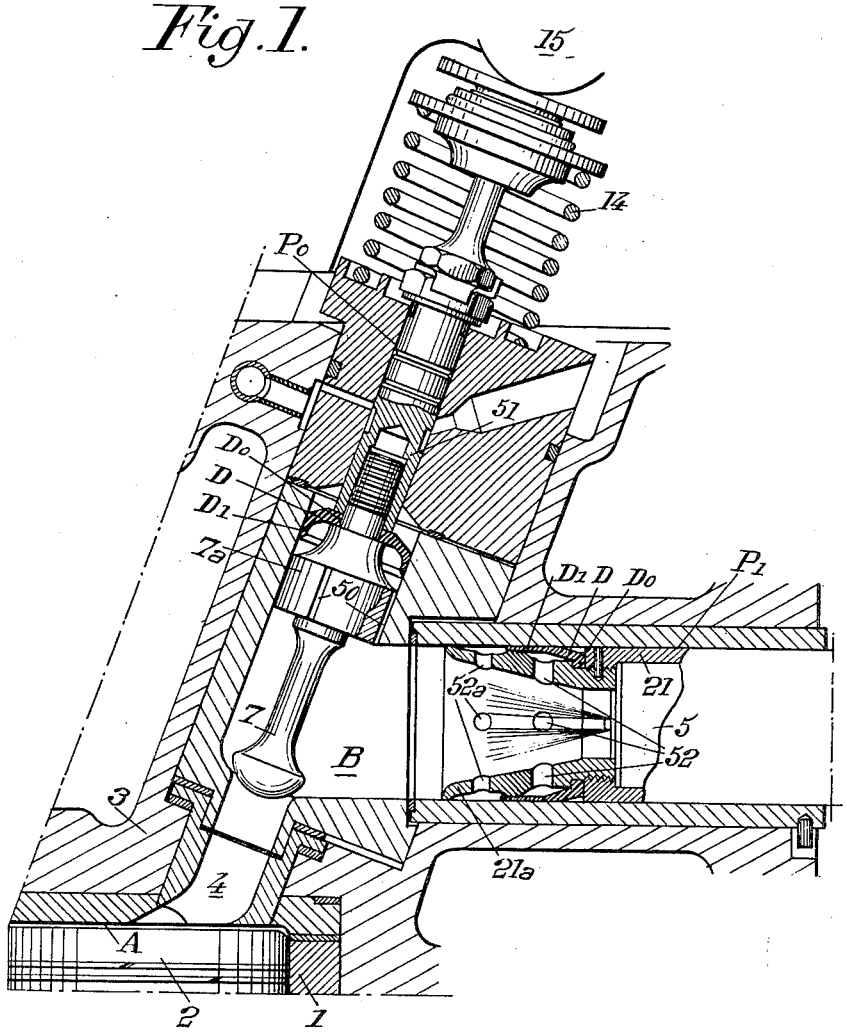

July 27, 1965  R. GEORGES  3,196,858
INTERNAL COMBUSTION ENGINES
Filed Sept. 18, 1963  3 Sheets-Sheet 1

July 27, 1965  R. GEORGES  3,196,858
INTERNAL COMBUSTION ENGINES
Filed Sept. 18, 1963  3 Sheets-Sheet 2

July 27, 1965  R. GEORGES  3,196,858
INTERNAL COMBUSTION ENGINES
Filed Sept. 18, 1963  3 Sheets-Sheet 3

3,196,858
INTERNAL COMBUSTION ENGINES
Raymond Georges, 65 Ave. Foch, Paris, France
Filed Sept. 18, 1963, Ser. No. 309,683
Claims priority, application France, Sept. 21, 1962,
910,160; Nov. 10, 1962, 915,013
27 Claims. (Cl. 123—32)

This invention relates to internal combustion piston engines, this expression being used in a very general sense in this case and irrespective of the cycle of operation of the engine. However, since the invention seems liable to be of the greatest interest in their case, it relates more specifically but not exclusively to internal combustion engines having a constant pressure cycle, that is to say those operating by direct fuel injection, of which engines of the diesel type are notable examples.

It has already been suggested to incorporate in engines of this kind at least one main combustion chamber in permanent communication through at least one transfer duct with a secondary combustion chamber into which the fuel is fed direct by at least one injection device carried on a movable support capable of being advanced to greater or lesser distance into the said secondary combustion chamber. The passage section, conducting the gases travelling between the main and secondary combustion chambers, is variable by the insertion of a plunger into the passage or transfer duct.

The primary purpose of the invention with respect to the engines of the type referred to, is to improve the operating conditions of the movable elements, and particularly the plunger and the bearer of the injection device, fitted into the secondary combustion chamber of the engine and whereof the guide surfaces would, failing special precautions, be impaired by the adverse action of the gases at high temperature issuing from the secondary combustion chamber referred to above.

According to the present invention there is provided an internal combustion engine comprising walls defining a combustion chamber, and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having one circumferential edge fixed and the other in rubbing contact with the surface with which it is in relative movement, and means of communication between the combustion chamber and the cavity between said main and complementary guide journals for permitting the passage of gas under pressure against the concave surface of the seal to ensure the sealing of the rubbing lip against the surface with which it is in relative movement. The seal is preferably of nickel or a cupro-nickel alloy.

The complementary guide bearing journal performs the function of a scraping element for the wastes of combustion which may adhere to the surface against which the complementary guide journal bears.

According to another feature of the invention there is provided an internal combustion engine comprising a cylinder head having an end portion and a side portion, a valve seat mounted in the end portion of the said cylinder head, and a cylinder base located in the cylinder head and having an internal edge spaced from the circumferential edge of the valve seat, and the major part of the cylinder base extending towards the valve seat is spaced from the end portion of the cylinder head.

The cylinder head of the engines is preferably of a light metal or alloy of satisfactory thermal conductivity and the cylinder base is formed of a metal or alloy such as a refractory metal or an austenitic steel of lower thermal conductivity but having high mechanical strength up to temperatures of the order of 900° and even more. By virtue of the function of a screen performed by the cylinder base mounted with the clearances according to the invention one simultaneously obtains a high temperature of the cylinder base and effective cooling of the valve seats.

Figure 2:
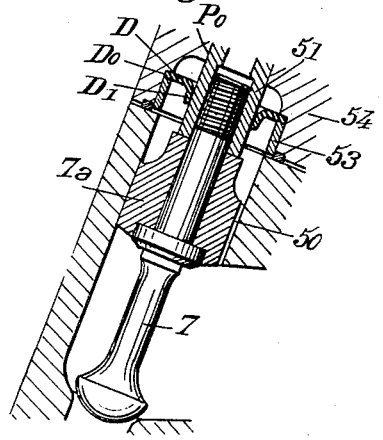
Figure 3:
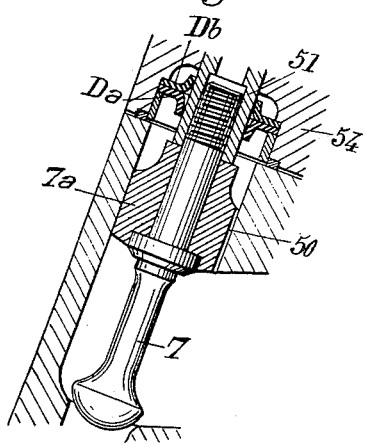
Figure 4:
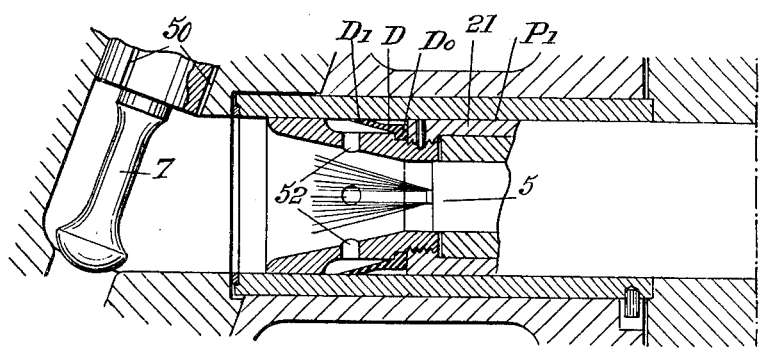
Figure 6:
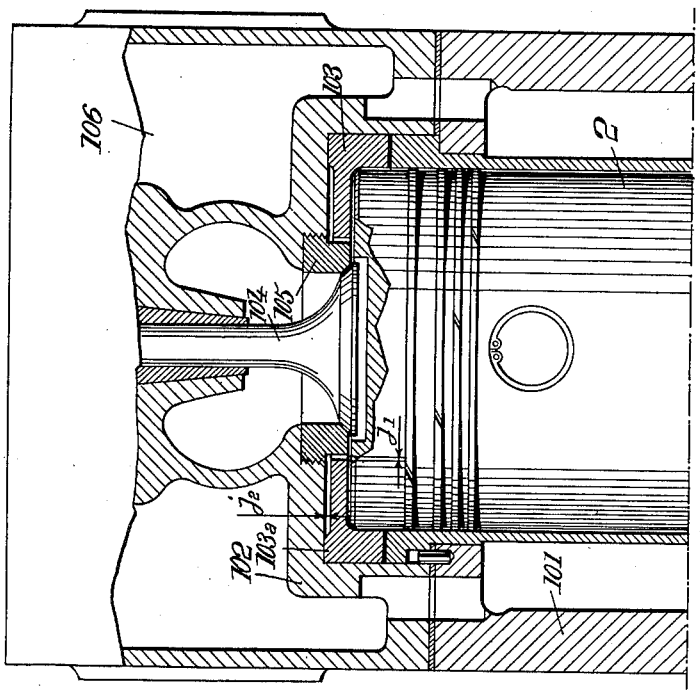
Figure 5:
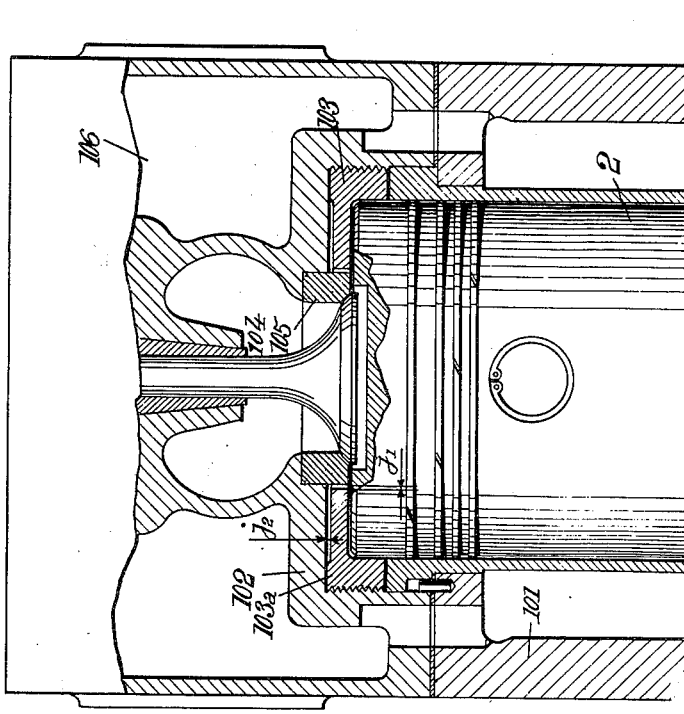

In order that the invention may be more clearly understood a description in general terms of an embodiment of the first feature of the invention is now given, by way of example only with reference to the accompanying drawings, in which:

FIGURE 1 illustrates in axial section, with parts cut and removed, the cylinder head of an internal combustion engine employing the constant pressure cycle, according to the invention, FIGURE 2 and 3 show, in axial sections, two embodiments of a seal associated with a plunger, FIGURE 4 shows in axial section, a seal associated with a fuel injector bearer, and FIGURES 5 and 6 show, in axial section, two forms of the cylinder head of a diesel engine according to another aspect of the invention.

In the drawings like reference numerals or letters denote the same or similar parts.

In FIGURE 1 is shown a cylinder 1 wherein there travels a piston 2 of which the crown together with the opposite wall of a cylinder head 3 delimits a main combustion chamber A.

A secondary combustion chamber B is wrought in the said cylinder head 3 and is in permanent communication with the said main combustion chamber A through at least one transfer passage 4. The introduction of fuel into this secondary chamber B*m* is by means of a convention injector 5 which is preferably fitted on a cylindrical sliding bearer 21, formed in a manner such that it may be advanced to a greater or lesser depth into the said secondary chamber, when the engine is stopped or when running, in order to modify the volume of this chamber, when this is demanded by a change in fuel.

Moreover, still in essentially known manner, and in order to allow control of the volume of the flow circulating from the chamber A to the chamber B or vice-versa, a plunger 7 is fitted which by the action of control devices to be explained more explicitly later, is adapted to be displaced between a retracted position and an extended position shown in FIGURE 1 in which its extremity is close to the transfer passage 4, thus reducing the minimum passage section available to the gases during transfer.

The control devices of the plunger 7 are formed so that the plunger is impelled towards its retracted position by a spring 14. An actuating element formed by a cam 15 renders it possible to propel the said plunger 7 from its retracted position to its extended position. For the operation of the cam, there is provided either a manual control which the driver would operate when the conditions of operation of, for example, the speed of the engine for reasons of safety require a reduction in the transfer volumes between the two chambers A and B, at low or idling speed.

Or, there is provided an automatic device subject to a feature of the operation of the engine, for example a tachymetric regulator causing the progressive retraction of the plunger 7 when the engine speed exceeds a predetermined threshold value, or else a cyclic control system causing the extension of the said plunger 7 when the piston 2 is close to its top dead centre and when the force borne by the said piston is a maximum.

It will be realised that in an engine such as has been referred to, the presence of displaceable elements such as the plunger 7 and the injector sleeve 21 located in the cylinder head and exposed to the action of the hot gases in the secondary combustion chamber B, raises a serious problem. The problem is met by the provision of an effective seal affording the protection against the harmful action of the said gases, to the guide journals and corresponding guide surfaces of the said sliding elements.

Each of the sliding elements just referred to (plunger 7 and injector sleeve 21) is provided with a flexible annular seal D disposed between the guide journal of the displaceable element and a complementary guide journal, also functioning as a scraping element, and disposed closer to the secondary combustion chamber B. One of the edges $D_o$ (inner or outer) of the flexible annular seal is used for attachment purposes and the other edge $D_1$ is in the form of a rubbing lip in contact with the surface along the sealing joint's path during the displacements of the displaceable element. Means of communication are provided to allow the gases occupying the said secondary combustion chamber B to act on the said rubbing lip by pressing it against the corresponding friction surface.

The seal D in the form of an annulus of metal or alloy which at the same time has satisfactory resistance against thermal strains and an adequate flexibility, which requirements are met by nickel and by the cupro-nickel alloys.

The attachment of the seal D, may be made either on the corresponding displaceable element in which case the fastening edge $D_o$ of the seal is its inner edge as shown in FIGURES 1 and 4; or on the wall of the bore wherein is displaced the said displaceable element, in which case the fastening edge $D_o$ of the seal is its outer edge as shown in FIGURES 2 and 3.

Fnally, the communication means allowing of "pressurisation" of the seal D may be provided in the stationary side of the bore housing the displaceable element, but it seems preferable for ease of construction, to provide the said means of communication in the element itself.

Particular embodiments of the seal according to the invention, will now be described, by way of example, with reference to FIGURES 1 to 4.

As shown in FIGURE 1, the plunger 7 comprises a cylindrical expansion 7a performing the function of a complementary scraping guide journal and on its outer side having longitudinal grooves 50 allowing the gases contained in the said secondary combustion chamber B to flow past the expansion 7a, the plunger 7 being screwed to a cylindrical rod 51 which performs the function of main guide journal $P_o$. The seal D which has the shape of a saucer with its concavity turned towards the chamber B is clamped by its inner edge between the plunger 7 and the cylindrical rod 51 carrying the said plunger.

The injector sleeve 21 whereof the outer side forms the main guide journal $P_1$, is extended towards the secondary combustion chamber B by an inset rigid and cylindrical extension 21a whereof the posterior part is constricted in such manner as to leave an annular space in which is mounted the seal D. The inner edge $D_o$ is clamped between the extension 21a and the injector sleeve 21 and the outer edge $D_1$ is engaged in a peripheral groove in the back of the extension 21a. Radial orifices 52 contrived in the said extension allow the seal D to be pressurised.

On the periphery of the extension 21a and in front of the lip $D_1$ of the joint D, an annular groove, supplied with gas under pressure through radial orifices 52a, is provided. This arrangement promotes the cleaning of the guide surface of the said extension.

Another form of embodiment of the seal D of the plunger 7 is shown in FIGURE 2, according to which the seal is secured by its outer edge $D_o$ to the side of the space housing the said plunger, and the inner edge $D_1$ of the said seal is then in the form of a lip rubbing on the cylindrical rod 51 carrying the plunger 7.

The attachment of the seal D by its outer edge is made by clamping the said edge between a shoulder in an inset plug 54 the plunger 7 and a ring 53 held by the inset plug 54.

FIGURE 3 shows a variant of the preceding embodiment, according to which the single seal of FIGURE 2 is replaced by two paired seals $Da$ and $Db$ attached by their outer edges and having their rubbing lips facing in opposed directions.

Finally, FIGURE 4 illustrates another form of embodiment of the seal D for the bearer 21 of the injector 5. This other embodiment differs from that illustrated in FIGURE 1 by the fact that the rubbing lip $D_1$ of the seal is no longer pressed between the scraping extension 21a and the guide bore $P_1$ of the said bearer, but bears freely on the said guide bearing surface.

Another feature of the invention will now be described in general terms with reference to FIGURES 5 and 6 by way of example. The embodiments are applicable to an engine of the type just described and which should be of a light-weight high-speed type.

As shown in FIGURES 5 and 6, this engine comprises a cylinder block 101 on which is mounted a cylinder head 102 made of light metal or alloy of satisfactory thermal conductivity, being of aluminium or aluminium alloy.

In order to maintain as high a possible wall temperature in each combustion chamber of this engine, inset cylinder bases 103 are made of a metal or alloy such as a refractory metal or an austenitic steel, of lower thermal conductivity than the light metal or alloy forming the cylinder head 102 but having at high temperatures (for example at temperatures of the order of 900° and even more) much greater qualities of mechanical strength. The said inset cylinder bases 103 then perform the function of heat baffles in respect of the said cylinder head 102.

Cutouts corresponding to the positions of the valves 104 of the cylinder are then wrought in the inset cylinder bases 103, the seats 105 of the said valves being formed separately from the said cylinder bases and inset direct into the cylinder head 102. The cooling of the cylinder head may be promoted by internal circulation in passages 106, which promote the dispersal of the heat generated in the said valve seats 105. These valve seats 105 may be wrought of any appropriate metal or alloy, for example of special bronze.

It is known that for an engine of the type referred to it is desirable for the temperature of the inset cylinder bases 103 to remain as high as possible, but for the temperature of the inset valve seats 105 on the other hand, to be stabilized at normal speed at a value distinctly lower than the temperature of the inset cylinder bases.

This double aim is pursued by mounting each inset cylinder base 103 and the corresponding inset valve seats 105 in such manner as to leave a substantial clearance between the said inset cylinder bottom 103 and, the said inset valve seats 105 (clearance $j_1$) on the one hand, and the cylinder head 102 (clearance $j_2$) over the major part of their opposing walls, on the other hand.

Thanks to the presence of these clearances, any substantial heat transfer by conduction will be prevented between the inset cylinder bases 103, which are at high temperatures, and the cylinder head 102 and the valve seats 105, which are at lower temperatures.

The clearances $j_1$ and $j_2$ referred to above may have identical or dissimilar values, but these clearances will preferably amount to between $1/10$ and $5/10$ of a mm. and may advantageously have a value of the order of $2/10$ of a mm.

Two embodiments of the second feature of the invention illustrated in FIGURES 5 and 6 respectively, will now be described more explicitly, by way of example.

According to the first of these embodiments shown in FIGURE 5, each inset cylinder base 103 has a marginal flange 103a and is secured by screwing into the cylinder head 102. The inset valve seats 105 are then screwed or force-fitted into the corresponding and preferably machined recesses, after the operations of tightening the cylinder bases 103 in the said cylinder head 102, and machining the cutouts in the said inset cylinder bases 103.

According to the second embodiment shown in FIGURE 6, each inset cylinder base 103 has a marginal flange 103a and is secured by insertion in a push fit into the cylinder head 102 after the mounting of the inset valve seats 105 by screwing or force-fit insertion. As the inset cylinder bases 103 can easily be withdrawn, the valve seats 105 can have wider shoulders than the diameter of the cutouts in the cylinder bases.

The invention is in no way limited to that of its methods of application, nor to those of the forms of embodiment of its various parts which have more particularly been specified; on the contrary, it encompasses all variants thereof.

I claim:

1. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having one circumferential edge fixed and the other in rubbing contact with the surface with which it is in relative movement, and means of communication between the combustion chamber and the cavity between said main and complementary guide journals for permitting the passage of gas under pressure against the concave surface of the seal to ensure the sealing of the rubbing lip against the surface with which it is in relative movement.

2. An internal combustion engine according to claim 1 wherein the seal is of nickel.

3. An internal combustion engine according to claim 1 wherein the seal is of a cupro-nickel alloy.

4. An internal combustion engine comprising walls defining a combustion chamber and a displaceable element, which displaceable element includes a plunger, communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having one circumferential edge fixed and the other in rubbing contact with the surface with which it is in relative movement, and means of communication between the combustion chamber and the cavity between said main and complementary guide journals for permitting the passage of gas under pressure against the concave surface of the seal to ensure the sealing of the rubbing lip against the surface with which it is in relative movement.

5. An internal combustion engine according to claim 4 wherein the seal is of nickel.

6. An internal combustion engine according to claim 4 wherein the seal is of a cupro-nickel alloy.

7. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having one circumferential edge fixed and the other in rubbing contact with the surface with which it is in relative movement, wherein the surface of the complementary guide journal engaging the wall of the combustion chamber comprises flanges defining channels communicating with the cavity between the main and complementary guide journals.

8. An internal combustion engine according to claim 7 wherein the seal is of nickel.

9. An internal combustion engine according to claim 7 wherein the seal is of a cupro-nickel alloy.

10. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having one circumferential edge fixed and the other in rubbing contact with the surface with which it is in relative movement, wherein the wall of the combustion chamber through which the displaceable element extends has passages communicating both with the interior of the chamber and the cavity between the main and the complementary guide journals.

11. An internal combustion engine according to claim 10 wherein the seal is of nickel.

12. An internal combustion engine according to claim 10 wherein the seal is of cupro-nickel alloy.

13. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having an inner circumferential edge fixed to the displaceable element and the outer circumferential edge in rubbing contact with the surface with which it is in relative movement, and means of communication between the combustion chamber and the cavity between said main and complementary guide journals for permitting the passage of gas under pressure against the concave surface of the seal to ensure the sealing of the rubbing lip against the surface with which it is in relative movement.

14. An internal combustion engine according to claim 13 wherein the seal is of nickel.

15. An internal combustion engine according to claim 13 wherein the seal is of a cupro-nickel alloy.

16. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having an outer circumferential edge fixed to the wall of the combustion chamber and an inner circumferential edge in rubbing contact with the displaceable element, and means of communication between the combustion chamber and the cavity between said main and complementary guide journals for permitting the passage of gas under pressure against the concave surface of the seal to ensure the sealing of the rubbing lip against the surface with which it is in relative movement.

17. An internal combustion engine according to claim 16 wherein the seal is of nickel.

18. An internal combustion engine according to claim 16 wherein the seal is of a cupro-nickel alloy.

19. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a flexible annular seal positioned between the main and complementary guide journals and presenting a concave surface to the interior of the combustion chamber, the seal having an inner circumferential edge fixed to the displaceable element and the outer circumferential edge in rubbing contact with the surface with which it is in relative movement being pressed against the said surface by the complementary guide journal, and means of communication between the combustion chamber and the cavity between said main and complementary guide journals for permitting the passage of gas under pressure against the concave surface of the seal to ensure the sealing of the rubbing lip against the surface with which it is in relative movement.

20. An internal combustion engine according to claim 19 wherein the seal is of nickel.

21. An internal combustion engine according to claim 19 wherein the seal is of a cupro-nickel alloy.

22. An internal combustion engine comprising walls defining a combustion chamber and a displaceable element communicating with the interior of the combustion chamber through one of the said walls, the displaceable element comprising a main guide journal and a complementary guide journal for controlling the displacement of the element relative to the said wall of the combustion chamber, the complementary guide journal being positioned nearer to the interior of the combustion chamber than the main guide journal and defining a cavity therewith, a first flexible annular seal positioned between the main and complementary guide journals, presenting a concave surface to the interior of the combustion chamber, a second flexible annular seal presenting a concave surface away from the interior of the combustion chamber, the first and second seals having one circumferential edge fixed and the other in rubbing contact with the surface with which they are in relative movement, and means of communication between the combustion chamber and the cavity between said main and complementary guide journals for permitting the passage of gas under pressure against the concave surface of the first seal to ensure the sealing of the rubbing lip against the surface with which it is in relative movement.

23. An internal combustion engine according to claim 22 wherein the seal is of nickel.

24. An internal combustion engine according to claim 22 wherein the seal is of a cupro-nickel alloy.

25. An internal combustion engine comprising walls defining main and secondary combustion chambers, said main and secondary combustion chambers having a transfer passage communicating therebetween, a displaceable element communicating with the interior of the secondary combustion chamber and comprising a plunger, for controlling the effective aperture of the transfer passage, and a stem on which the plunger is mounted, said stem extending through one of the walls of the secondary combustion chamber, main and complementary guide journals mounted on said stem for controlling the displacement of the stem relative to the said wall of the secondary combustion chamber, the complementary guide journal being positioned nearer to the interior of the secondary combustion chamber than the main guide journal and defining a cavity with the main guide journal and the wall of the secondary combustion chamber, a flexible annular seal positioned in the cavity between the main and complementary guide journals and presenting a concave surface to the interior of the secondary combustion chamber, the inner circumferential edge of said seal being clamped between the complementary guide journal and the stem of the displaceable element and the outer circumferential edge of the seal being in rubbing contact with the wall of the secondary combustion chamber and flanges on the complementary guide journal defining channels communicating with the cavity between the main and complementary guide journals.

26. An internal combustion engine comprising walls defining main and secondary combustion chambers, said main and secondary combustion chambers having a transfer passage communicating therebetween, a displaceable element communicating with the interior of the secondary combustion chamber and comprising a plunger, for controlling the effective aperture of the transfer passage, and a stem on which the plunger is mounted, said stem extending through one of the walls of the secondary combustion chamber, main and complementary guide journals mounted on said stem for controlling the displacement of the stem relative to the said wall of the secondary combustion chamber, the complementary guide journal being positioned nearer to the interior of the secondary combustion chamber than the main guide journal and defining a cavity with the main guide journal and the wall of the secondary combustion chamber, a flexible annular seal presenting a concave surface to the interior of the secondary combustion chamber, the outer circumferential edge of the said annular seal being fixedly located in the wall of the secondary combustion chamber and the inner edge of the said annular seal being in rubbing contact with the stem, and flanges being provided on the complementary guide journal to define channels communicating with the cavity between the main and complementary guide journals.

27. An internal combustion engine comprising walls defining main and secondary combustion chambers having a transfer passage communicating therebetween, displaceable injection means communicating with the interior of the secondary combustion chamber and comprising an injector, a main guide journal embracing said injector and controlling the displacement of the injector through a wall of the secondary combustion chamber, a complementary guide journal mounted on said main guide journal and defining a cavity with the main guide journal and the wall of the secondary combustion chamber, said complementary guide journal having a plurality of orifices communicating with said cavity and an annular flexible seal fixedly located between said main and complementary guide journals and having an outer circumferential part gripped between said complementary guide journal and the wall of the secondary combustion chamber.

References Cited by the Examiner
UNITED STATES PATENTS

| | | | |
|---|---|---|---|
| 2,778,347 | 1/57 | Von Mallinckrodt | 123—32 |
| 2,969,786 | 1/61 | Dolza | 123—191 |
| 2,991,780 | 7/61 | Brien | 123—191 |
| 3,077,868 | 2/63 | Georges | 123—32 |

RICHARD B. WILKINSON, *Primary Examiner.*